Sept. 13, 1927.  
G. I. SMITH  
1,642,564  
MOLD  
Filed June 22, 1926
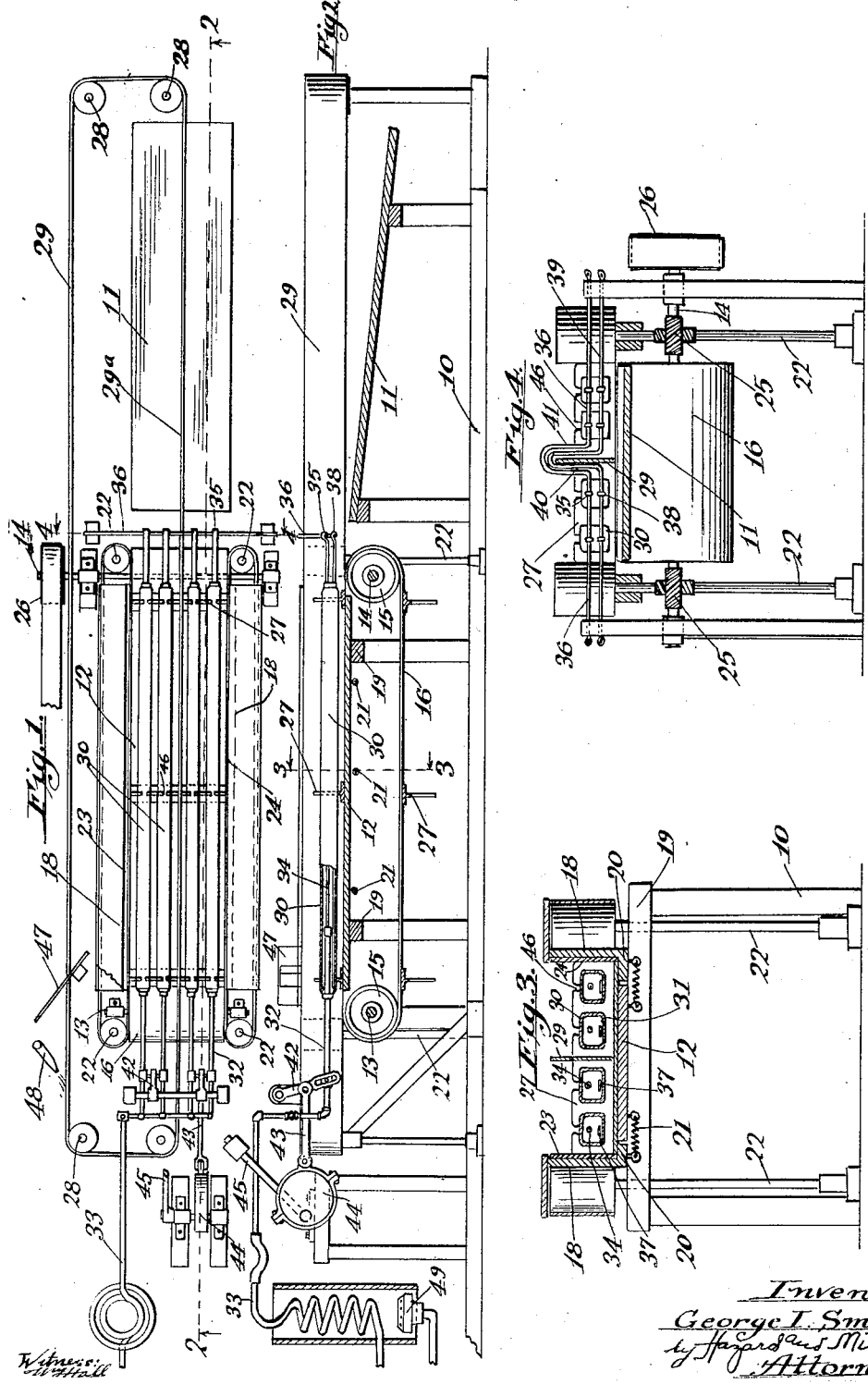
Inventor  
George I. Smith  
by Hazard and Miller  
Attorneys Patented Sept. 13, 1927.

1,642,564

UNITED STATES PATENT OFFICE.

GEORGE I. SMITH, OF LOS ANGELES, CALIFORNIA.

MOLD.

Application filed June 22, 1926. Serial No. 117,708.

This invention relates to improvements in molds and is an improvement over the constructions shown in my pending applications, Serial No. 34,820, filed June 4, 1925, and Serial No. 68,562, filed November 12, 1925.

The primary object of this invention is to provide an improved mold wherein building blocks formed of self-hardening plastic material may be easily and quickly made or formed, the mold being so constructed as to have a minimum amount of breakage on separating the hardened blocks from the walls of the mold.

Another object of this invention is to provide an improved mold having movable side walls and a bottom which are formed by endless belts.

With the foregoing and other objects in view which will be made manifest in the following detailed description and specifically pointed out in the appended claims, reference is had to the accompanying drawings for an illustrative embodiment of the invention, wherein:

Figure 1 is a top plan view of the improved mold,

Fig. 2 is a sectional view taken substantially upon the line 2—2 of Fig. 1,

Fig. 3 is a vertical section taken substantially on the line 3—3 of Fig. 2, and

Fig. 4 is a sectional view taken substantially on the line 4—4 of Fig. 1.

Referring to the accompanying drawings wherein similar reference characters designate similar parts throughout, the improved mold consists of a suitable frame generally designated at 10, which provides two stationary tables 11 and 12. These tables are slightly separated from each other, but are arranged approximately on the same level. Beneath the ends of the table 12 there are two transverse shafts 13 and 14 which carry pulleys 15 over which an endless belt 16 extends. The endless belt 16 has a portion resting on top of the table 12. The upper portion of the endless belt 16 which rests on top of the table 12 forms the bottom of the mold. Movable side walls 18 are slidable upon the transverse beams 19 which support the table 12, and these side walls have flanges at their bottoms indicated at 20 which extend inwardly beneath the edges of the belt 16. The side walls are urged toward the sides of the table 12 by means of springs 21.

Four upright shafts 22 are mounted on the frame and are arranged adjacent the corners of the table 12. These shafts carry pulleys over which endless belts 23 and 24 extend. These endless belts are arranged parallel to the movable side walls 18 and each belt has a portion which passes against the inside face of its respective side walls. The mentioned portions of each of the endless belts 23 and 24 form the sides of the mold. The vertical shafts can be driven off of the transverse shaft 14 by means of gears indicated at 25, and power may be supplied to the transverse shaft 14 by means of a drive pulley 26. In this way the endless belts 16, 23 and 24 can all be driven together off of the transverse shaft 14.

A plurality of partitions 27 are fastened at intervals to the endless belt 16. These partitions are adapted to slide or fit between the endless belts 23 and 24 and serve to divide the space between the sides of the mold into compartments and to provide ends for the mold. On four vertical shafts which are indicated at 28 there are pulleys over which an endless belt 29 extends. This endless belt has a portion 29$^a$ which extends between the side walls of the mold and is positioned about half way between them. In this manner the portion 29$^a$ of the endless belt 29 forms a longitudinal partition in the mold. It fits between the divided portions of the partitions 27.

A plurality of collapsible cores are provided for the mold, each consisting of an elongated flexible tube 30. These cores extend through openings 31 formed in the partitions and are so arranged as to be positioned about half way between the tops and bottoms of the partitions. Extending into each core at one end is a pipe 32, and these pipes are connected together and to a supply pipe 33. They are adapted to supply the interior of the tubes 30 with fluid pressure to cause them to be inflated or expanded and to become fairly rigid. On release of the pressure the cores will collapse and this collapsing of the cores may be assisted by applying a vacuum pump or the like to the supply pipe 33. A rod 34 connects each pipe with a hook 35 at the opposite end of the mold and these hooks are adapted to be fastened or hooked over a cross bar 36 which extends across the complete mold. In the event that air is employed to inflate the cores, metallic rods 37 are fastened to the ends of the pipes 32 within the cores and are positioned against the bottom of the tubes 30 to keep the tubes from tending to float in the plastic material which is placed in the mold. In the event that a liquid, such as water, is used to inflate or expand the tubes 30, the rods 37 are arranged at the top of their respective cores so as to support the cores in proper position. The opposite ends of the rods 37 are provided with hooks 38 which hook over a cross bar 39 similar in construction to the cross bar 36. Both of the cross bars are bent as indicated at 40 and 41 to permit the partition forming portion 29ª of the endless belt 29 to pass beneath them. As a means for quickly applying tension to the rods 34 and 37 the pipes 32 are provided with a pin and slot connection with levers 42, which are connected by means of a link 43 to an eccentric 44 having a hand lever 45. By swinging the hand lever tension may be quickly applied to the rods 34 and 37 or released therefrom.

The operation of the improved mold is as follows: The plastic material is placed in the mold between the belts 23 and 24. It is smoothed off even with the top of the partitions, and the cores being inflated, the plastic material is allowed to become hardened. After hardening, the belts 16, 23, 24 and 29 are moved to convey the blocks so formed toward the table 11. The belts 23 as they pass around the pulleys on their respective shafts 22 peel away from the sides of the blocks, and as the belt 16 passes over the pulley 15 on the shaft 14, it tends to peel off of the bottom of the blocks. Before such movement of the belts takes place, however, the cross bars 36 and 39 are removed, so that the partitions and blocks merely slide over the cores which have been deflated. As the partitions pass around the pulley on the shaft 14, they slip over the hooks 35 and 38, provision being made for this movement by the small openings 46 at the top of the partitions. The blocks are thus delivered onto the stationary supporting table 11 and easily become detached from the partition forming portion 29ª of the endless belt 29. As the partitions 27 on the under side of the belt 16 pass over the pulley on the shaft 13, they swing up over the pipes 32, these pipes entering the openings 31 by means of the small openings 46. In this way a complete new smooth dry mold can be very quickly formed by the machine providing for the pouring of additional material to form additional blocks.

If desired, a suitable scraper indicated generally at 47 may be employed to scrape off the material which may stick to the belts, and oil may be applied, as indicated at 48, to the belts to resist any tendency of the plastic material to stick to them. In order to hasten the setting of the material, the fluid which is supplied to the cores to inflate them may be heated in the pipe 33 as indicated by the burner 49.

From the above described construction it will be readily appreciated that an improved mold is provided for forming building blocks and the like of plastic materials. The improved mold permits a large quantity of blocks to be formed in a minimum time and enables also the construction of a large quantity of blocks to be made quickly and of uniform size.

It will be understood that various changes in the detail of construction may be made without departing from the spirit or scope of the invention as defined by the appended claims.

I claim:

1. A mold having a bottom and sides provided by portions of endless belts, partitions fastened to one of the belts adapted to assume positions transversely of the mold extending between the sides, said partitions having openings therethrough for the reception of cores, and cores adapted to be positioned in the openings.

2. A mold having a table, sides movably mounted adjacent the side edges of the table and extending upwardly therefrom, spring means urging the sides toward the side edges of the table, an endless belt having a portion extending over the top of the table, and additional endless belts having portions passing against the opposed faces of said sides, whereby the belts provide the bottom and sides of the mold.

3. A mold having a table, sides extending upwardly from the table, an endless belt having a portion passing over the top of the table, additional endless belts having portions passing against the opposed faces of the sides, whereby the belts provide the bottom and sides of the mold, partitions secured to the first mentioned belt adapted to assume positions transversely across the mold between the other endless belts, said partitions having openings therethrough, and collapsible cores adapted to assume positions extending through said openings.

4. A mold having a bottom and a pair of sides each of which is provided with portions of endless belts, partitions fastened to one of the belts adapted to assume positions transversely of the mold extending between the sides, there being apertures in said partitions adapted to receive a core, and means whereby said core may be automatically removed from said apertures upon operation of said endless belts.

5. A mold having a bottom and a pair of sides each of which is provided by portions of endless belts, partitions fastened to one of the belts adapted to assume positions transversely of the mold extending between the sides, said partitions having apertures therein adapted to receive a core, and a slot communicating with said apertures whereby said core may be automatically removed.

In testimony whereof I have signed my name to this specification.

GEORGE I. SMITH.